United States Patent
Kabasawa (10) Patent No.: US 6,219,204 B1
(45) Date of Patent: Apr. 17, 2001

(54) RECORDING-MEDIUM RECORDING AND REPRODUCING DEVICE

(75) Inventor: Hidetoshi Kabasawa, Saitama-ken (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 09/190,983

(22) Filed: Nov. 12, 1998

(30) Foreign Application Priority Data

Nov. 13, 1997 (JP) .................................................. 9 312369

(51) Int. Cl.⁷ .................................................. G11B 21/02
(52) U.S. Cl. .................................. 360/266.6; 369/249
(58) Field of Search .................................. 360/106, 266.2, 360/266.4, 266.5, 266.6; 369/219, 244, 249, 215

(56) References Cited

U.S. PATENT DOCUMENTS

| | | | | |
|---|---|---|---|---|
| 4,577,521 | * | 3/1986 | Takikawa | 74/89.2 |
| 5,303,223 | * | 4/1994 | Sakaguchi et al. | 369/215 |
| 5,687,159 | * | 11/1997 | Kim | 369/219 |
| 5,761,183 | * | 6/1998 | Ikegame | 369/220 |
| 5,912,789 | * | 6/1999 | Konno et al. | 360/106 |

FOREIGN PATENT DOCUMENTS

| | | |
|---|---|---|
| 6-68165 | 9/1994 | (JP) . |
| 07161152 | * 6/1995 | (JP) . |
| 07262714 | * 10/1995 | (JP) . |
| 08055444 | * 2/1996 | (JP) . |
| 8-227562 | 9/1996 | (JP) . |

* cited by examiner

*Primary Examiner*—David L. Ometz
*Assistant Examiner*—Angel Castro
(74) *Attorney, Agent, or Firm*—Anderson, Kill & Olick P.C.

(57) ABSTRACT

A head carriage supports a head which performs recording and reproducing on a recording medium. A guide shaft guides a movement of the head carriage. A guide-shaft holding member holds an end portion of the guide shaft at a predetermined position of a frame. A driving portion moves the head carriage along the guide shaft. The guide-shaft holding member includes a fixed portion fixed on the frame, a leaf spring portion extending from the fixed portion and pushing the end portion of the guide shaft to the frame, and a supporting portion projecting from the fixed portion so as to support an intermediate portion in the longitudinal direction of the leaf spring portion.

6 Claims, 10 Drawing Sheets

RECORDING-MEDIUM RECORDING AND REPRODUCING DEVICE

BACKGROUND OF THE INVENTION

1. Field of the Invention

The present invention relates to a recording-medium recording and reproducing device, and, in particular, to a recording-medium recording and reproducing device having a head moving mechanism for causing heads to approach a recording medium in response to conveyance of the recording medium.

2. Description of the Related Art

For example, an electronic apparatus such as a personal computer, a word processor or the like is equipped with a magnetic disk device as means for recording information. In the magnetic disk device, when a disk cartridge as a recording medium is loaded, a magnetic disk contained in the disk cartridge is driven and rotated, and, also, magnetic heads slide on the magnetic disk so that magnetic recording and reproducing are performed.

Further, in the above-mentioned magnetic disk device, a head carriage supporting the magnetic heads moves in a radial direction of the magnetic disk along guide shafts. Thereby, the magnetic heads are caused to slide on an arbitrary track of the magnetic disk, and magnetic recording or reproducing is performed.

Further, in the magnetic disk device, high-density information storage has been attempted as a result of a disk rotation speed being increased. Thus, the magnetic disk having a large capacity has been provided. In the magnetic disk device for such a type of large-capacity magnetic disk, as a result of a floating force due to an air flow occurring due to high-speed rotation of the magnetic disk being applied to the magnetic heads, the magnetic heads slightly float above the surfaces of the magnetic disk, and magnetic recording and reproducing are performed.

Also in the magnetic disk device having such an arrangement, the head carriage supporting the magnetic heads, when a driving force is provided by a motor, moves in a radial direction of the magnetic disk along a pair of guide shafts which are provided in parallel.

The guide shaft is supported in a condition in which the guide shaft is pushed to a step portion or the like provided at a predetermined position of a frame by a leaf spring member. That is, a base end portion of the leaf spring member is screwed to the frame and a projecting end portion of the leaf spring member pushes an end portion of the guide shaft in a direction perpendicular to the longitudinal direction in a condition in which the leaf spring is elastically deformed.

In the above-described magnetic disk device, when the guide shaft moves, the movement of the head carriage is unstable, and it is not possible to perform high-density recording. Therefore, it is necessary to use the leaf spring for holding the guide shaft, them leaf spring having a strong spring force. For this purpose, the lateral width of the leaf spring is large.

However, when the size of the leaf spring is thus large, a space for disposing the leaf spring is large. Thereby, it may not be possible to miniaturize the device. Further, because a motor is close to the guide shaft as a result of miniaturization of the device, it is difficult to screw the leaf spring in proximity to the motor. Therefore, the leaf spring is screwed at a place apart from the motor. As a result, the length of the leaf spring is large, and, thereby, it is difficult for the leaf spring to push the guide shaft strongly.

SUMMARY OF THE INVENTION

An object of the present invention is to provide a recording-medium recording and reproducing device in which the above-mentioned problem is solved.

A recording-medium recording and reproducing device, according to the present invention, comprises:
- a head carriage supporting a head which performs recording and reproducing on a recording medium;
- a guide shaft guiding a movement of the head carriage;
- a guide-shaft holding member holding an end portion of the guide shaft at a predetermined position of a frame; and
- a driving portion moving the head carriage along the guide shaft, wherein the guide-shaft holding member comprises:
- a fixed portion fixed on the frame;
- a leaf spring portion extending from the fixed portion and pushing the end portion of the guide shaft; and
- a supporting portion projecting from the fixed portion so as to support an intermediate portion in the longitudinal direction of the leaf spring portion.

In the above-described arrangement, the guide-shaft holding member includes the fixed portion fixed on the frame, the leaf spring portion extending from the fixed portion and pushing the end portion of the guide shaft, the supporting portion projecting from the fixed portion so as to support the intermediate portion in the longitudinal direction of the leaf spring portion. Therefore, even when the lateral width of the leaf spring portion is reduced or the length of the leaf spring portion is elongated, because the intermediate portion of the leaf spring portion is supported by the supporting portion, it is possible to increase a force to hold the guide shaft sufficiently so that the guide shaft can be held positively. Therefore, it is possible to miniaturize the device as a result of reducing the lateral width of the leaf spring portion, and, also, because the head carriage can stably move without shaking, it is possible to perform high-density recording.

Other objects and further features of the present invention will become more apparent from the following detailed description when read in conjunction with the accompanying drawings.

DETAILED DESCRIPTION OF THE PREFERRED EMBODIMENT

With reference to figures, one embodiment of a recording-medium recording and reproducing device according to the present invention will now be described.

Figure 1:
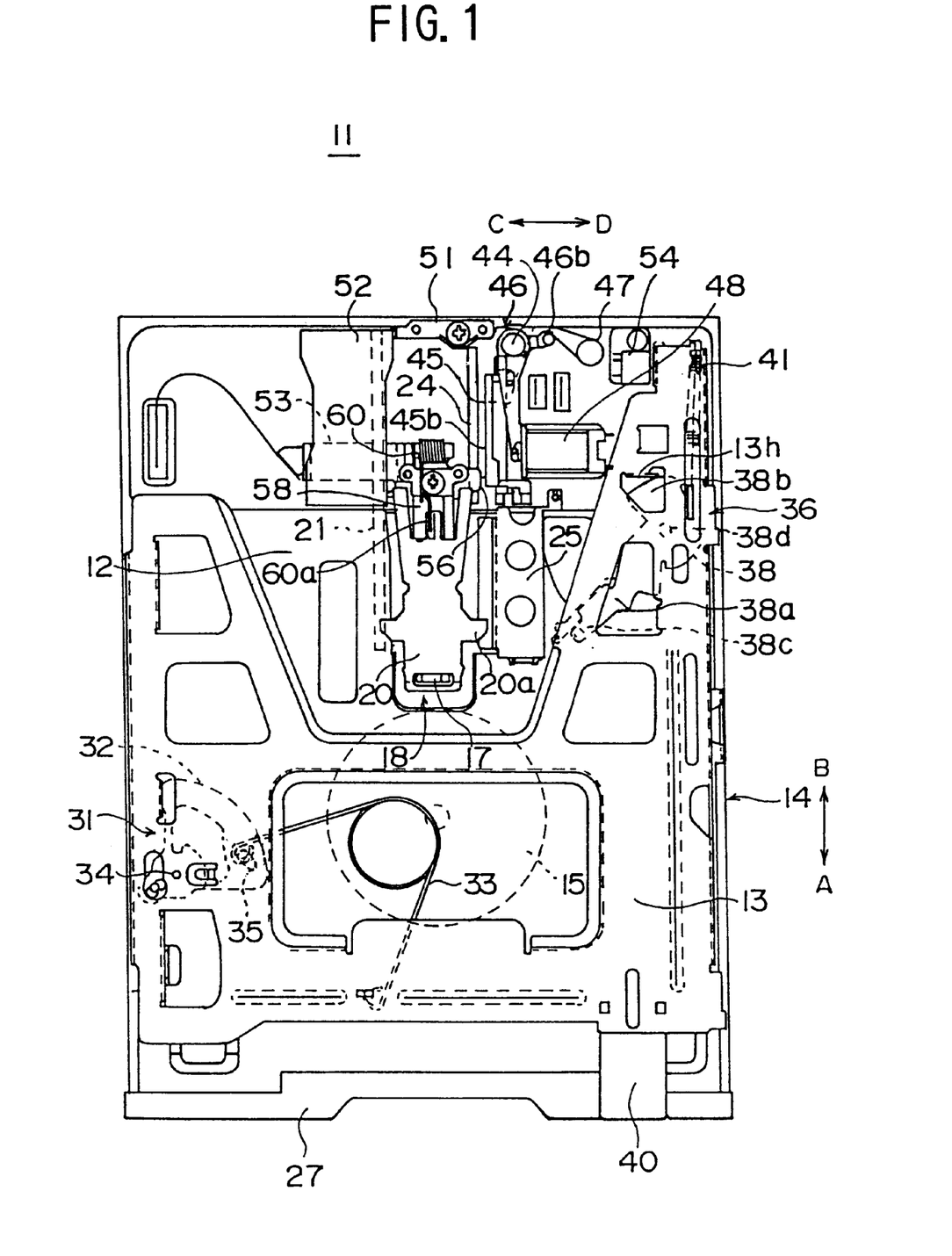
FIG. 1 shows a plan view of a magnetic disk device in one embodiment of a recording-medium recording and reproducing device according to the present invention.
Figure 2:
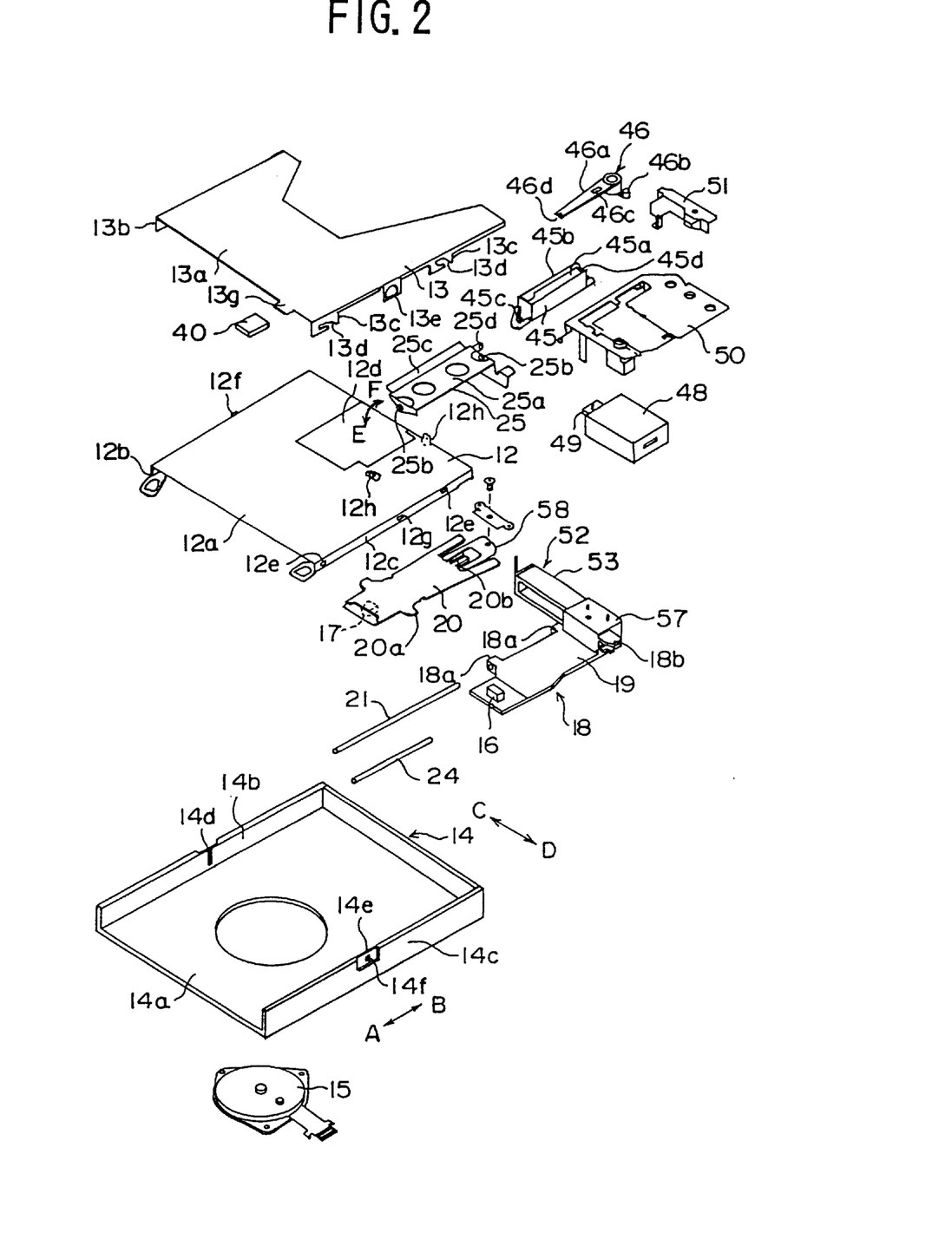
FIG. 2 shows an exploded perspective view showing a general arrangement of the magnetic disk device.

FIG. 1 shows a plan view of a magnetic disk device 11 in the embodiment of the recording-medium recording and reproducing device according to the present invention. FIG. 2 shows an exploded perspective view showing a general arrangement of the magnetic disk device 11.

As shown in FIGS. 1 and 2, in the magnetic disk device 11, a disk holder 12 in which a disk cartridge (not shown in the figures) is inserted, and a slider 13 which slides forward and backward so as to lift and lower the disk holder are mounted on a frame 14. The slider 13 is provided slideably in directions A and B on the frame 14. In response to the insertion of the disk cartridge, the slider slides in the direction A and lowers the disk holder 12 from a cartridge inserting and ejecting position to a cartridge loading position.

On a surface 14a of the frame 14, a turntable 15 which is driven by a disk-rotation motor and a head carriage 18 which supports magnetic heads 16, 17 are provided. Further, on the bottom surface of the frame 14, a circuit substrate (not shown in the figure) having a control circuit is mounted.

The head carriage 18 includes a carriage body 19 which supports the lower magnetic head 16 on the top surface of a projecting end portion of the carriage body 19, and a head arm 20 which is rotatably mounted on the carriage body 19 and supports the upper magnetic head 17 on the bottom surface of a projecting end portion of the head arm 20. The head carriage 18 is mounted slideably in the forward and backward directions (directions A, B).

The head carriage 18 is provided so as to be movable as a result of being guided by guide shafts 21, 24 which extend in the forward and backward directions (directions A, B).

Shaft-passing portions 18a comprise circular holes through which the main guide shaft 21 passes, and determines the moving directions, the lateral directions and the height position of the head carriage 18. A shaft-passing portion 18b has a U shape in which the guide shaft 24 is fitted, and does not determine the moving directions and lateral directions of the head carriage 18 but determines the height position of the head carriage 18.

The head carriage 18 is guided by the guide shafts 21, 24 and moves in the directions A, B as a result of being driven by a voice-coil motor 52 which will be described later. As a result, the magnetic heads 16, 17 supported by the head carriage 18 are caused to slide on a desired track of the magnetic disk (not shown in the figure) contained in the disk cartridge, and perform magnetic recording and reproducing.

A damper mechanism 31 is provided on the bottom surface of the slider 13. Specifically, on the bottom surface of the slider 13, a shaft 34 which rotatably supports a damper plate 32 is provided, and, in the damper plate 32, a hooking portion 35 which is hooked by one end portion of a torsion spring 33 is provided.

The damper mechanism 31 is not an oil damper but a mechanical damper using a spring force and applies a force to the slider 13 such that a speed of a sliding operation of the slider 13 is reduced. The damper mechanism 31 includes the damper plate 32 rotatably provided on the bottom plate of the slider 13 and the torsion spring 33 which applies a force to the damper plate 32.

At the beginning of a movement of the disk holder 12 from the cartridge inserting and ejecting position to the cartridge loading position, the damper mechanism 31 pushes the slider 13 in the direction (direction B) reverse to the direction in which the slider 13 moves. Then, when the damper plate 32 rotates more than a predetermined angle during the process of the sliding of the slider 13, the damper mechanism 31 pushes the slider 13 in the direction (direction A) in which the slider 13 moves. Thus, when the magnetic disk is loaded, the damper mechanism 31 reduces the speed of the slider 13, using the spring force of the torsion spring 33, and reduces the speed of lowering of the disk holder 12, that is, reduces the speed of loading of the disk.

The disk holder 12 includes a top plate 12a and cartridge guide portions 12b, 12c which bend so as to hold the disk cartridge from both sides. A space enclosed by the top plate 12a and the cartridge guide portions 12b, 12c of both sides is a cartridge inserting portion.

In the top plate 12a of the disk holder 12, an opening 12d for the head carriage 18 to move therein is provided. A lifter 25 is rotatably mounted on the right side of the opening 12d. The lifter 25 comes into contact with a projection 20a which projects from the right side of the head arm 20. The head arm 20 lifts and lowers the magnetic head 17 intermittently in response to the rising and falling operations of the disk holder 12. Thus, a head moving mechanism comprises the disk holder 12, the head arm 20, the lifter 25 and so forth.

Shafts 25b projecting from the both sides of a body 25a of the lifter 25 are supported by supporting portions 12h which stand from the top plate 12a of the disk holder 12. Thereby, the lifter 25 can rotate in the directions E, F perpendicular to the carriage moving directions (directions A, B).

Further, on the both sides of the disk holder 12, pairs of engaging pins 12e which engage with the slider 13 are provided, respectively. From the centers of both sides of the disk holder 12, guide portions 12f, 12g project. The guide portions 12f, 12g are fitted into guide grooves 14d, 14e provided in side walls 14b, 14c of the frame 14, and, thereby, the rising and falling operations of the disk holder 12 are guided.

As will be described later, in response to the rising and falling operations of the disk holder 12, a contact portion 25c of the lifter 25 provided on the top plate 12a of the disk holder 12 comes into contact with the projection 20a of the head arm 20 and the lifter 25 rotates so as to gradually lower the head arm 20. The contact portion 25c extends through the length corresponding to the length from the most inside track to the most outside track of the disk, that is, the length corresponding to the stroke of the head carriage 18.

The slider 13 is slideably mounted above the disk holder 12. The slider 13 includes a J-shaped plane plate 13a, side portions 13b, 13c which bend downward from both sides of the plane plate 13a, inclined grooves 13d which are provided in the side portions 13b, 13c and into which the engaging pins 12e of the disk holder 12 are fitted, and engaging holes 13e which engage with projections 14f projecting from the centers of both side surfaces of the frame 14. Further, the slider 13 includes a projection 13g which projects from the right side of the front end of the slider 13. An ejecting button 40 is fixed to the projection 13g. Further, a force is applied to the slider 13 in the direction A by a coil spring 41.

Figure 3:
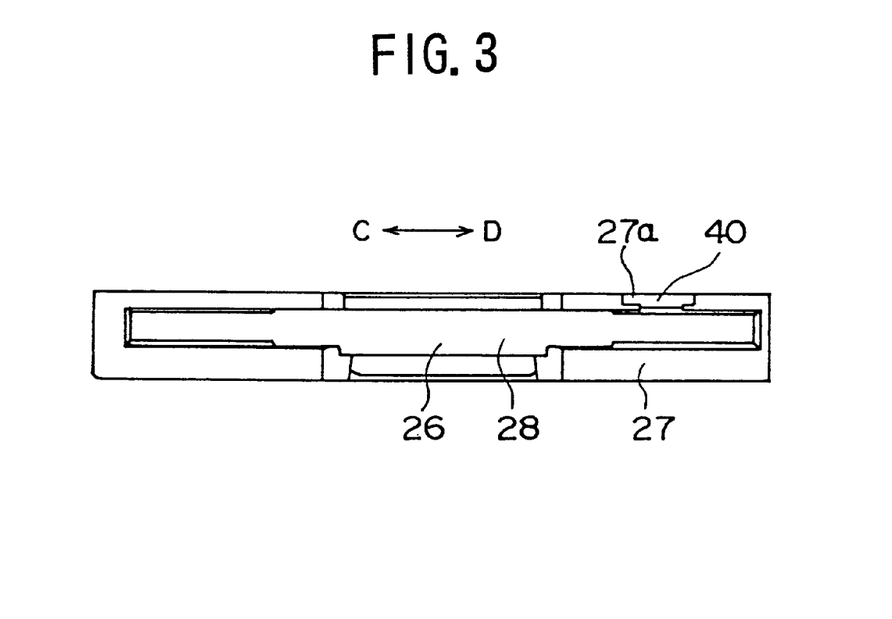
FIG. 3 shows a front elevational view of the disk device.

FIG. 3 shows a front elevational view of the disk device 11.

As shown in FIG. 3, a front bezel 27 having a disk inserting hole 26 is mounted on the front end of the frame 14. On the right side of a top end portion of the bezel 27, a recess portion 27a into which the ejecting button 40 is slideably fitted is provided. On the rear side of the bezel 27, a flap 28 for covering the disk inserting hole 26 from the inside is mounted rotatably in opening and closing directions.

Figure 4:
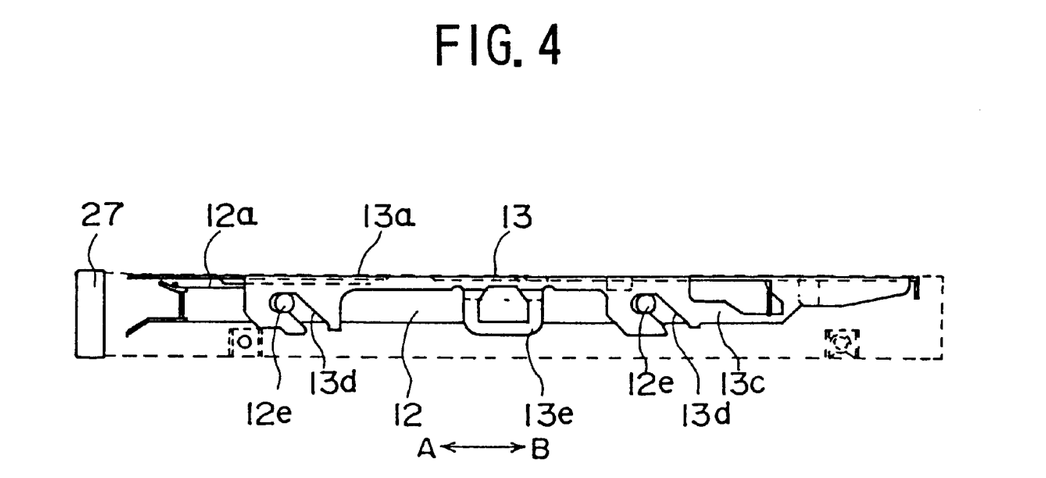
FIG. 4 shows a side elevational view showing a condition in which a disk holder and a slider are combined in the magnetic disk device.

FIG. 4 shows a side elevational view showing a condition in which the disk holder 12 and the slider 13 are combined.

As shown in FIG. 4, the engaging pins 12e of the disk holder 12 are fitted into the inclined grooves 13d of the slider 13. Thereby, in response to the sliding operation of the slider 12, the engaging pins 12e are driven along the inclined grooves 13d. Thereby, when the slider 13 slides in the direction B, the disk holder 12 rises to the cartridge inserting and ejecting position. When the slider 13 slides in the direction A, the disk holder 12 falls to the cartridge loading position. Thus, a recording medium conveying mechanism comprises the disk holder 12 and the slider 13.

With reference to FIG. 1, a latch mechanism 36 includes a latch lever 38 which is rotatably supported on the top surface of the disk holder 12, and the coil spring 41 which applies a force to the latch lever 38 counterclockwise. The coil spring 41 acts as a slider returning spring for applying a force to the slider in the direction A, and, also, acts as a latch lever returning spring for applying a force to the latch lever 38.

The latch lever 38 includes a lever portion 38a for opening and closing the shutter (not shown in the figure) of the disk cartridge, and an arc-shaped movement-preventing portion 38b which prevents a movement-to-be-prevented portion 13h of the slider from moving.

In response to the insertion of the disk cartridge into the disk holder 12, the latch lever 38 rotates clockwise as a result of being pushed by the front end of the disk cartridge. Then, when the arc-shaped movement-preventing portion 38b is removed from the movement-to-be-prevented portion 13h of the slider 13, the slider 13, to which a force is applied by the coil spring 41, slides in the direction A.

As a result of the latch lever 38 thus rotating, a projecting end portion 38c of the lever portion 38a pushes the shutter (not shown in the figure) of the disk cartridge in the opening direction. Thereby, the magnetic heads 16, 17 can slide on the magnetic disk. When the ejecting button 40 is pressed in the direction B and the slider 13 slides in the same direction, movement prevention of the movement-preventing portion 38b which has been in contact with a side surface of the movement-to-be-prevented portion 13h of the slider 13 is released. Thereby, the latch lever 38 rotates counterclockwise by the spring force of the coil spring 41.

As will be described later, a carriage stopper 45 prevents the head carriage 18 from moving when the disk cartridge is ejected, and prevents the magnetic heads 16, 17 from sliding on the magnetic disk (not shown in the figure). A body 45a of the carriage stopper 45 is mounted so as to extend in the directions A, B so as to face the right side of the guide shaft 24. Similar to the lifter 25, the carriage stopper 45 is supported by bearing portions (not shown in the figure) formed on the frame 14 rotatably in the directions E, F. The carriage stopper 45 includes a rack 45b which prevents the head carriage 18 from moving, and a V-shaped recess portion 45c with which an engaging pin 25d projecting from an end portion of the lifter 25 engages.

On the right side surface of the head carriage 18, a movable rack 56 which faces the rack 45b is provided. The rack 45b extends through the length corresponding to the length from the most inside track to the most outside track of the disk, that is, the length corresponding to the stroke of the head carriage 18. Therefore, as a result of the carriage stopper 45 rotating in the direction E, the rack 45b engages with the movable rack 56 so that the carriage stopper 45 locks the head carriage 18.

A stopper coupling lever 46 is rotatably supported by a shaft 44 provided on the frame 14. The stopper coupling lever 46 includes an arm 46a extending in the direction A, and a spring connecting portion 46b extending in a direction approximately perpendicular to the direction A. In a base portion of the arm 46a, a long circular engaging hole 46c with which a projecting pin 45d engages is provided. The projecting pin 45d projects from a rear portion of the top surface of the body 45a of the carriage stopper 45.

The spring connecting portion 46b of the stopper coupling lever 46 is connected with one end portion 47a of a torsion spring 47. The other end portion 47b of the torsion spring 47 is in contact with the inner wall of the rear portion of the frame 14. Thereby, a force is applied to the stopper coupling lever 46 clockwise by the spring force of the torsion spring 47, that is, the force is applied to the stopper coupling lever 46 in the direction such that the head carriage 18 is prevented from moving.

A solenoid 48 is energized by a signal from the control circuit (not shown in the figures) and attracts a plunger 49 in the direction D. A projecting end portion of the plunger 49 is connected with a projecting end portion of the arm 46a of the stopper coupling lever 46. Therefore, when the plunger 49 is attracted in the direction D as a result of the solenoid 48 being energized, the stopper coupling lever 46 rotates counterclockwise, that is, the stopper coupling lever 46 rotates in the direction such that the movement prevention of the head carriage 18 is released.

A holding member 50 is formed from a sheet metal so that, as a result of being fixed on the frame 14, the holding member 50 covers the guide shaft 24, the stopper coupling lever 46, the solenoid 48 and the torsion spring 47.

A guide-shaft holding member 51 is fixed on the frame 14 so as to hold end portions of the guide shafts 21, 24 which guide the movement of the head carriage 18.

A coil 53 of the voice-coil motor 52 (driving portion) is integrally provided on the left side surface of the head carriage 18. The voice-coil motor 52 is provided at the left side of the guide shaft 21 which is disposed in proximity to the center of gravity of the head carriage 18.

As a result, the head carriage 18 is driven in the directions A, B by the single voice-coil motor 52, and, thereby, the magnetic heads 16, 17 can perform a seeking operation. Therefore, in comparison to a case where a pair of voice coil motors are provided on the both sides of the head carriage, the head carriage is miniaturized, the moving space of the head carriage is reduced, and it is possible to miniaturize the magnetic disk device.

Figure 5:
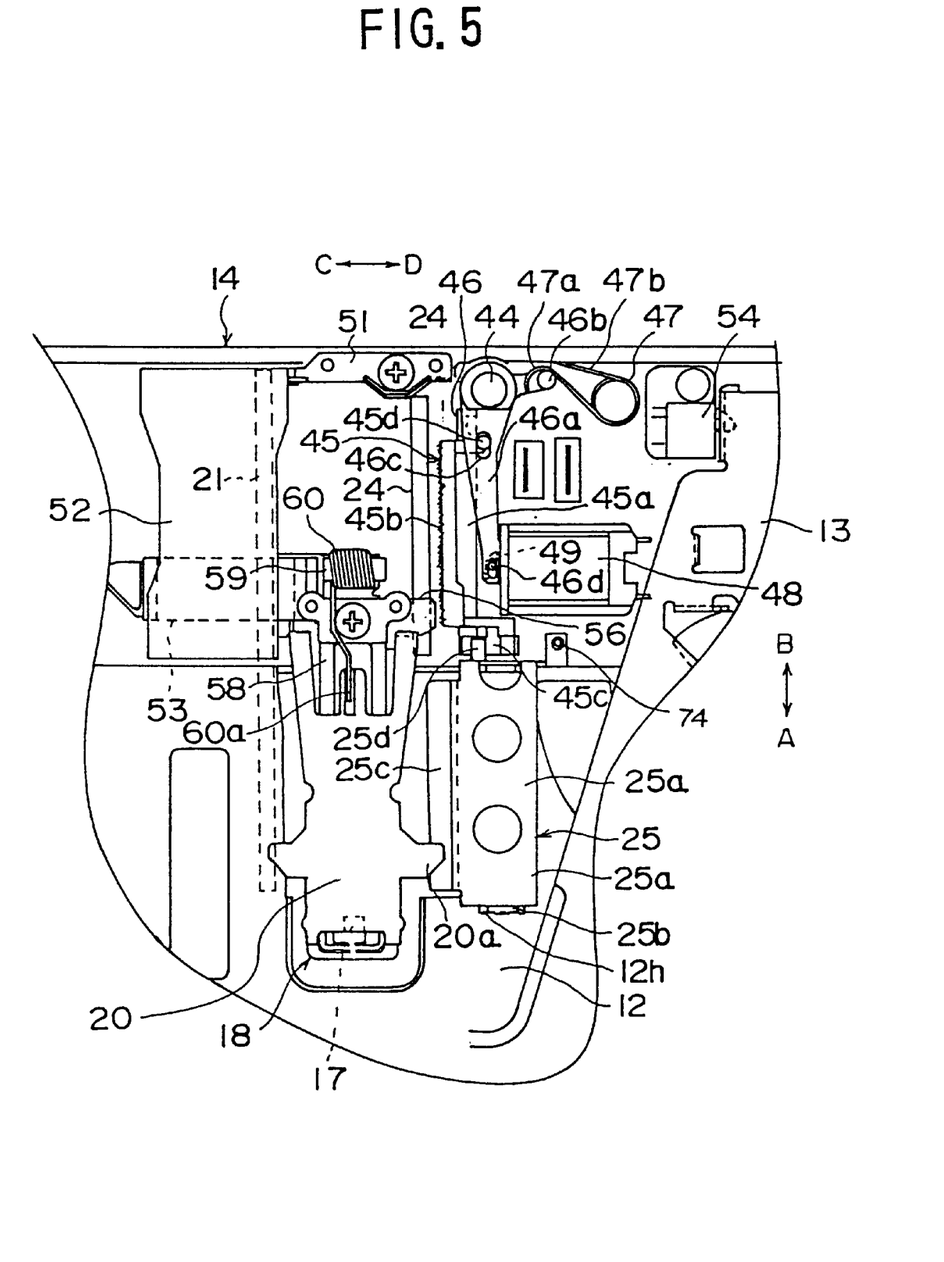
FIG. 5 shows a magnified plan view showing a head carriage and a periphery thereof in a recording and reproducing mode in the magnetic disk device.

FIG. 5 shows a magnified plan view showing the head carriage 18 and a periphery thereof in a recording and reproducing mode.

As shown in FIG. 5, the head arm 20 is supported on a supporting stand 57 (shown in FIG. 2) of the head carriage 18 via a leaf spring 58 rotatably in the vertical directions. Further, the head arm 20 is pushed downward by a pushing portion 60a which extends in the direction A from a torsion spring 60. The torsion spring 60 is wound on a shaft 59 which is provided at a rear portion of the supporting stand 57.

As a result, the projection 20a projecting from the head arm 20 rightward is pushed onto the top surface of the contact portion 25c of the lifter 25 by the spring force of the torsion spring 60. The engaging pin 25d projecting from the end portion of the lifter 25 engages with the V-shaped recess portion 45c provided at an end portion of the carriage stopper 45. Therefore, as will be described later, the lifter 25 intermittently rotates in response to a rotation operation of the carriage stopper 45.

The plunger 49 which is attracted by the solenoid 48 is connected with a projecting end portion 46d of the arm 46a of the stopper coupling lever 46. The spring connecting portion 46b of the stopper coupling lever 46 is pushed clockwise by the spring force of the torsion spring 47. Thereby, the carriage stopper 45, the projecting pin 45d of which engages with the engaging hole 46c of the stopper coupling lever 46, rotates, by the spring force of the torsion spring 47, in the direction (direction E) such that the head carriage 18 is prevented from moving. Thus, the rack 45b of the carriage stopper 45 engages with the movable rack 56 of the head carriage 18 so that the head carriage 18 is locked.

At a rear portion of the frame 14, an ejection detecting switch 54 which detects that the slider 13 slides in the ejecting direction is provided. When the ejecting button 40 is pressed in the direction B, the ejection detecting switch 54 is pressed by an end portion of the slider 13 which slides in the same direction and enters the close condition.

Figure 6A:
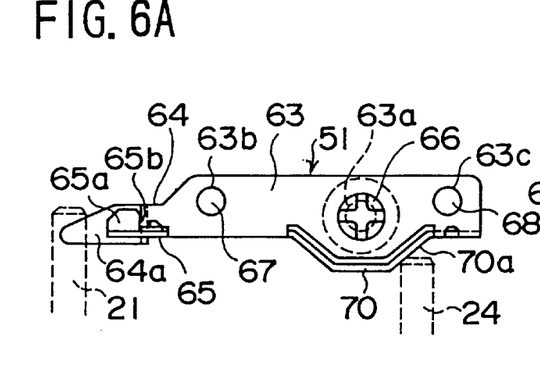
FIGS. 6A, 6B and 6C show a holding member holding one end portion of a guide shaft in the magnetic disk device.
Figure 6B:
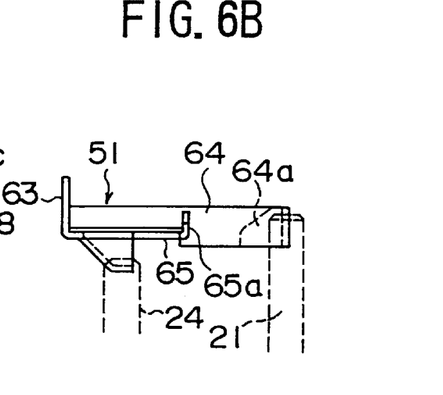
Figure 6C:
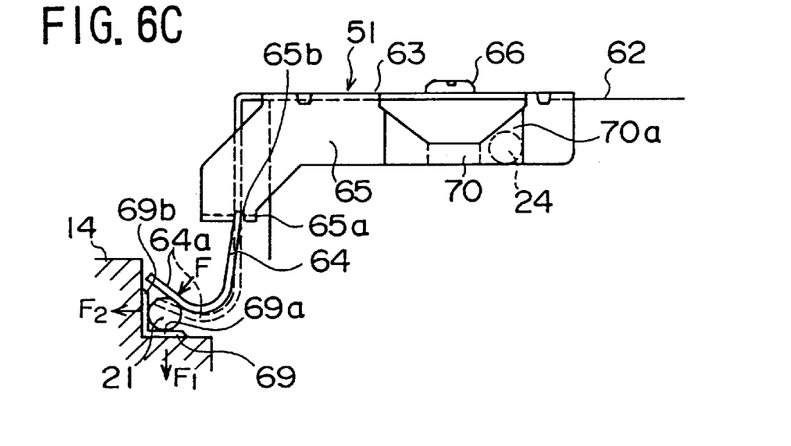

FIGS. 6A, 6B and 6C illustrate the guide-shaft holding member 51 which holds the end portion of the guide shaft 21.

As shown in FIGS. 6A, 6B and 6C, the guide-shaft holding member 51 includes a plane-shaped fixed portion 63 which is fixed on a mounting portion 62 provided on the frame 14, a leaf spring portion 64 which extends downward from an end portion of the fixed portion 63 and pushes the end portion of the guide shaft 21 in a direction perpendicular to the longitudinal direction of the guide shaft 21, and a supporting portion 65 which projects from the fixed portion 63 so as to support an intermediate portion of the leaf spring portion 64.

An inserting hole 63a into which a mounting bolt 66 is inserted, and position determining holes 63b, 63c are provided in the fixed portion 63. The position determining holes 63b, 63c are apart from the inserting hole 63a on both sides, and position determining bosses 67, 68 which project from the mounting portion 62 are fitted into the position determining holes 63b, 63c. Thereby, the fixed portion 63 is fixed by the mounting bolt 66 to the mounting portion 62, and, also, the mounting position of the fixed portion 63 is determined and the rotation of the fixed portion 63 is prevented, by the position determining bosses 67, 68.

The leaf spring portion 64 is bent downward from the left end of the fixed portion 63. For the purpose of reducing the length of the device in the directions A, B, the lateral width of the leaf spring portion 64 is made to be short. As a result, the leaf spring portion 64 is likely to bend, and the spring force of the leaf spring portion 64 is weak. Further, the leaf spring portion 64 includes, at a projecting end portion thereof, a pushing portion 64a which is bent so as to have a J shape. The pushing portion 64a pushes the end portion of the guide shaft 21 by the spring force F applied to the guide shaft 21 obliquely downward.

The guide shaft 21 is pushed by the pushing portion 64a to an L-shaped step portion 69 formed on the frame 14. The spring force of the pushing portion 64a is applied to the guide shaft 21 obliquely downward. As a result, the spring force of the pushing portion 64a is applied to the end portion of the guide shaft 21 as vertical-direction and horizontal-direction components $F_1$ and $F_2$ which push the end portion of the guide shaft 21 vertically and horizontally to a horizontal portion 69a and a vertical portion 69b of the step portion 69.

Further, the leaf spring portion 64 is inserted into a slit 65b which is provided at a projecting end portion 65a which is bent horizontally at the projecting end of the supporting portion 65 projecting downward from the fixed portion 63. Thereby, the intermediate portion in the longitudinal direction of the leaf spring portion 64 is inserted into and sandwiched by the slit 65b of the supporting portion 65. As a result, only the portion of the leaf spring portion 64, which portion extends downward from the slit 65b, can be elastically deformed. Thereby, the strength of the leaf spring portion 64 is increased.

Further, as a result of the intermediate portion in the longitudinal direction of the leaf spring portion 64 being supported by the supporting portion 65, the elastically deformable range of the leaf spring portion 64 is only the portion below the projecting end portion 65a of the supporting portion 65. Thereby, when the pushing force to be applied to the guide shaft 21 by the leaf spring portion 64 is increased as a result of the leaf spring portion 64 being more elastically deformed, the portion of the leaf spring 64 above the projecting end portion 65a of the supporting portion 65 is prevented from being deformed. As a result, it is possible to increase the spring force of the leaf spring portion 64 to hold the guide shaft 21, and, thus, to hold the guide shaft stably.

Thus, even though the lateral width of the leaf spring portion 64 is reduced so that the length of the device in the directions A, B can be reduced, because the intermediate portion in the longitudinal direction of the leaf spring portion 64 is supported by the supporting portion 65, the leaf spring portion 64 stably holds the guide shaft 21 in a condition in which the guide shaft 21 does not shake, and, thereby, it is possible to move the head carriage 18, the movement of which is guided by the guide shaft 21, in the stable condition.

Further, the guide-shaft holding member 51 includes a contact portion 70 on the front side of the fixed portion 63. An end portion of the other guide shaft 24 is in contact with the contact portion 70.

The other end portion of the guide shaft 21 is fixed to the frame 14 in a conventional method.

Figure 7:
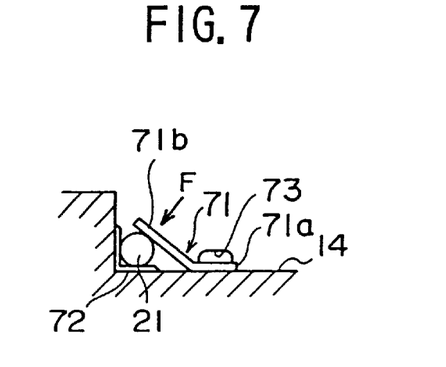
FIG. 7 shows a mechanism holding the other end portion of the guide shaft.

FIG. 7 shows a mechanism for holding the other end portion of the guide shaft 21.

As shown in FIG. 7, the other end portion of the guide shaft 21 is held by a holding member 71 formed of a leaf spring in a step portion 72 formed on the frame 14. The holding member 71 is bent angularly as shown in the figure. A horizontal portion 71a of the holding member 71 is fixed on the frame 14 by a mounting bolt 73. A pushing portion 71b of the holding member 71, which portion is inclined, comes into contact with the guide shaft 21 and is elastically deformed. Thereby, the holding member 71 pushes the other end portion of the guide shaft 21 in a direction perpendicular to the longitudinal direction of the guide shaft 21, and holds the other end portion of the guide shaft 21 in the step portion 72.

A disk loading operation of the magnetic disk device 11 having the above-described arrangement will now be described.

With reference to FIGS. 1 and 4, when the disk cartridge (not shown in the figures) is inserted into the disk holder 12 through the disk inserting hole 26 of the bezel 27, the latch lever 38 is pushed and is rotated clockwise. Then, when the movement-preventing portion 38b of the latch lever 38 is removed from the movement-to-be-prevented portion 13h of the slider 13, the slider, to which a force is applied by the coil spring 41, slides in the direction A.

As a result of the latch lever 38 thus rotating clockwise, the movement prevention of the slider 13 is released, and, also, the projecting end portion 38c of the lever portion 38a opens the shutter (not shown in the figures) of the disk cartridge.

Both sides of the disk holder 12 are supported movably only in the vertical direction by the left and right side walls of the frame 14. Therefore, when the slider 13 slides in the direction A, because the engaging pins 12e of the disk holder 12 are driven along the inclined grooves 13d, the disk holder 12 falls from the cartridge inserting and ejecting position to the cartridge loading position.

Figure 8:
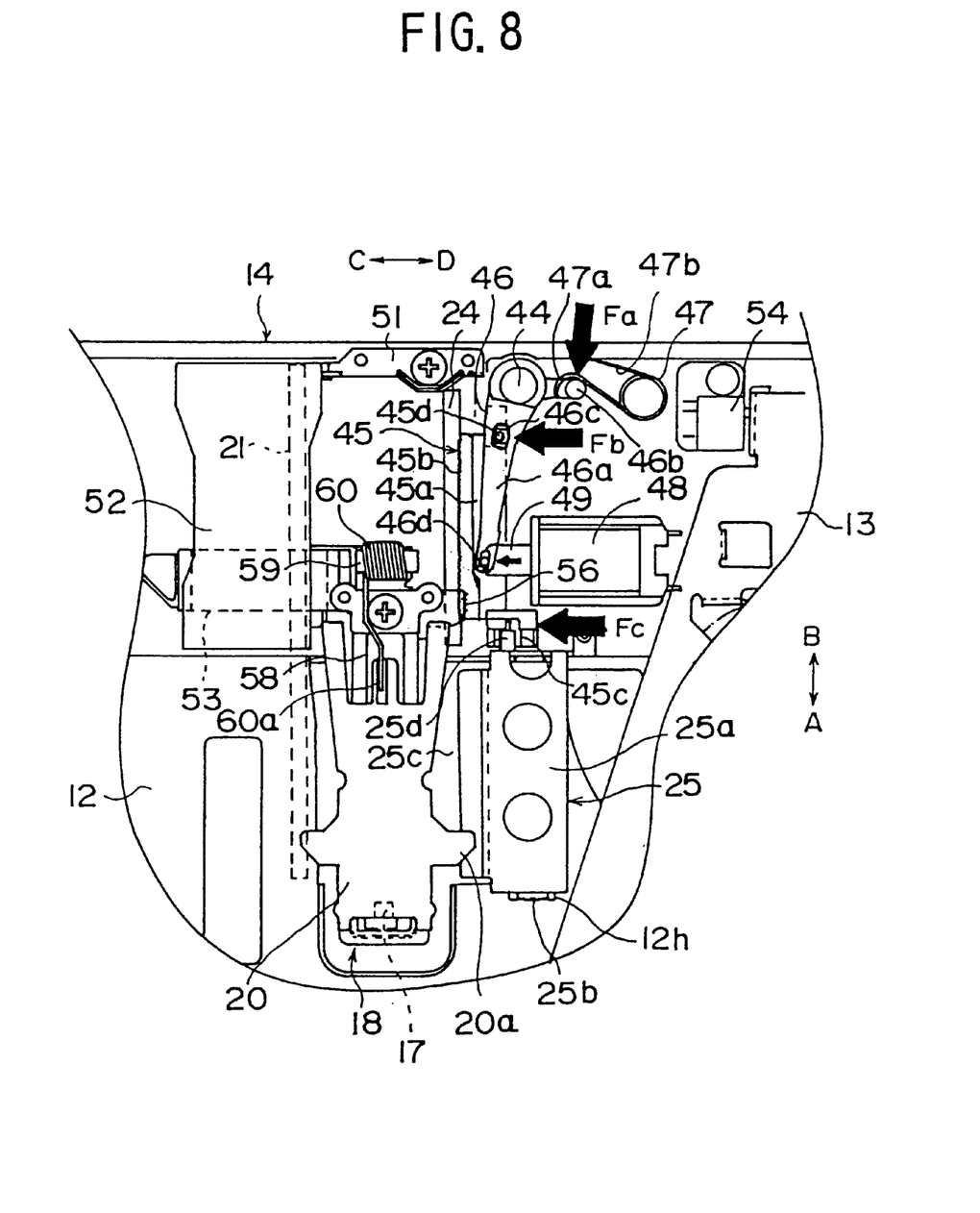
FIG. 8 shows a magnified plan view showing the head carriage and the periphery thereof in an ejecting mode in the magnetic disk device.

FIG. 8 shows a magnified plan view showing the head carriage 18 and the periphery thereof in an ejecting mode.

As shown in FIG. 8, in the ejecting mode, an end portion of the slider 13, which portion extends in the direction B, is in contact with the ejection detecting switch 54, and causes the ejection detecting switch 54 to enter the closed condition. Thereby, the ejection detecting switch 54 outputs an ejection detection signal to the control circuit (not shown in the figure). Thereby, the solenoid 48 is de-energized and cause the plunger 49 to move in the direction C.

Further, in the ejecting mode, because the solenoid 48 is not energized, the stopper coupling lever 46 is rotated clockwise by the spring force Fa of the torsion spring 47. Thereby, the carriage stopper 45 rotates in the direction toward the head carriage 18. As a result, the rack 45b is caused to engage with the movable rack 56 of the head carriage 18.

The spring force Fa of the torsion spring 47 acts as a pushing force Fb which pushes the projecting pin 45d, which engages with the engaging hole 46c of the stopper coupling lever 46, in the direction C.

The head carriage 18 is driven in the directions A, B by the voice-coil motor 52. Therefore, when no driving force is supplied by the voice-coil motor due to absence of power supply or the like, the head carriage 18 would freely move if nothing else prevents movement of the head carriage 18. However, in the ejecting mode, because the rack 45b of the carriage stopper 45 engages with the movable rack 56 of the head carriage 18, and, thereby, the head carriage 18 is locked, the head carriage 18 can be prevented from freely moving.

When, in any other mode, absence of power supply occurs, no driving force is supplied by the voice-coil motor 52. However, because also the solenoid 48 is de-energized, the head carriage 18 is locked, and the head carriage 18 can be prevented from freely moving.

Figure 9:
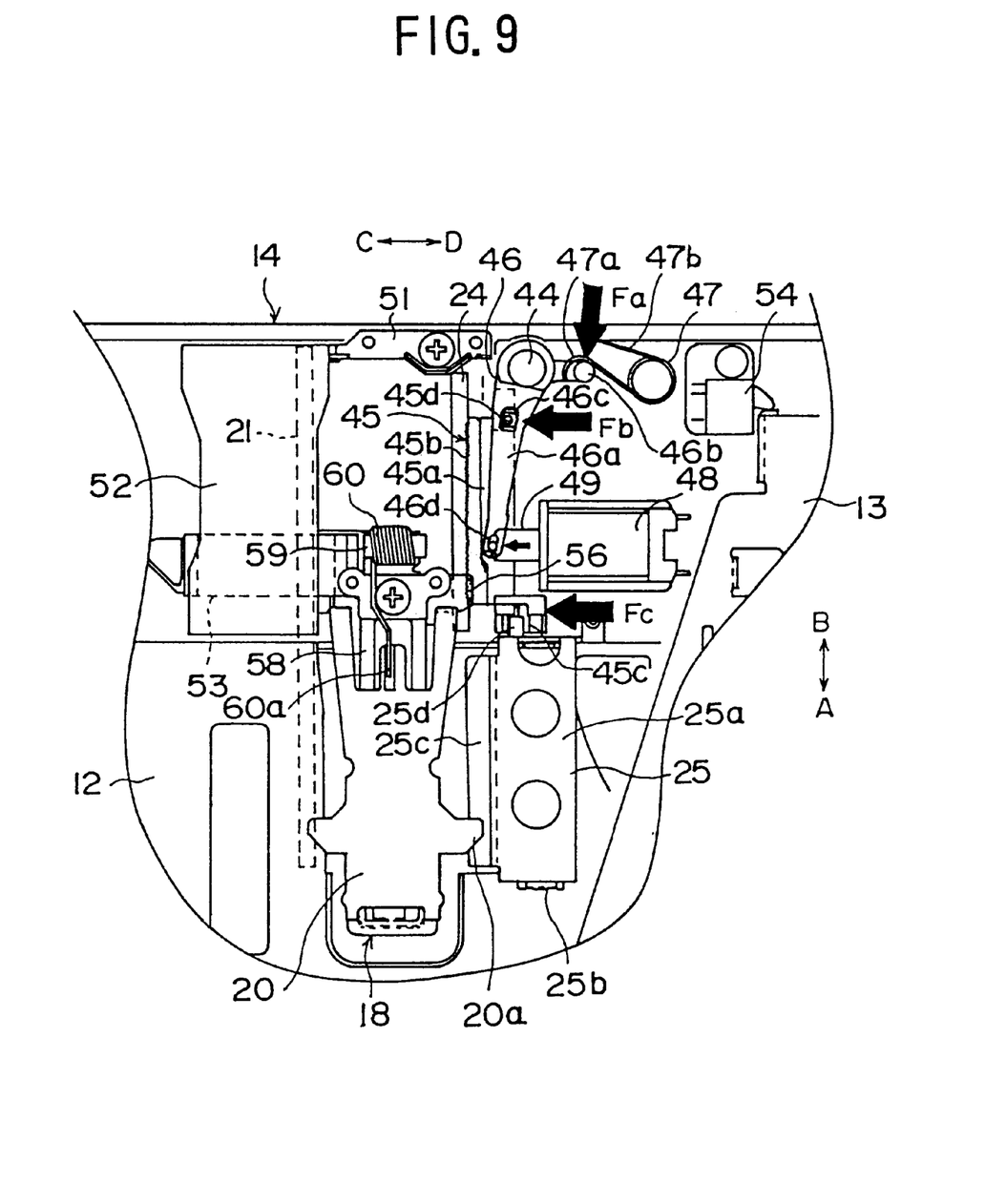
FIG. 9 shows a magnified plan view showing the head carriage and the periphery thereof in a waiting-for condition in the recording and reproducing mode in the magnetic disk device.

FIG. 9 shows a magnified plan view showing the head carriage 18 and the periphery thereof in a waiting-for condition in the recording and reproducing mode.

As shown in FIG. 9, when the magnetic disk device 11 is in the waiting-for condition such as a stand-by condition, a sleep condition or the like in the recording and reproducing mode, the head carriage 18 does not perform the seeking operation. In this case, the solenoid 48 is de-energized. Thereby, similar to the case of the above-described ejecting mode shown in FIG. 8, the stopper coupling lever 46 rotates clockwise by the spring force Fa of the torsion spring 47, and the carriage stopper 45 rotates toward the head carriage 18. Thereby, the rack 45b engages with the movable rack 56 of the head carriage 18.

Thereby, in the waiting-for condition in the recording and reproducing mode, the head carriage 18 is locked so as to be prevented from moving in the directions A, B.

Operations of the head carriage 18 in response to operations of the carriage stopper 45, stopper coupling lever 46, torsion spring 47 and solenoid 48 will now be described.

Figure 10:
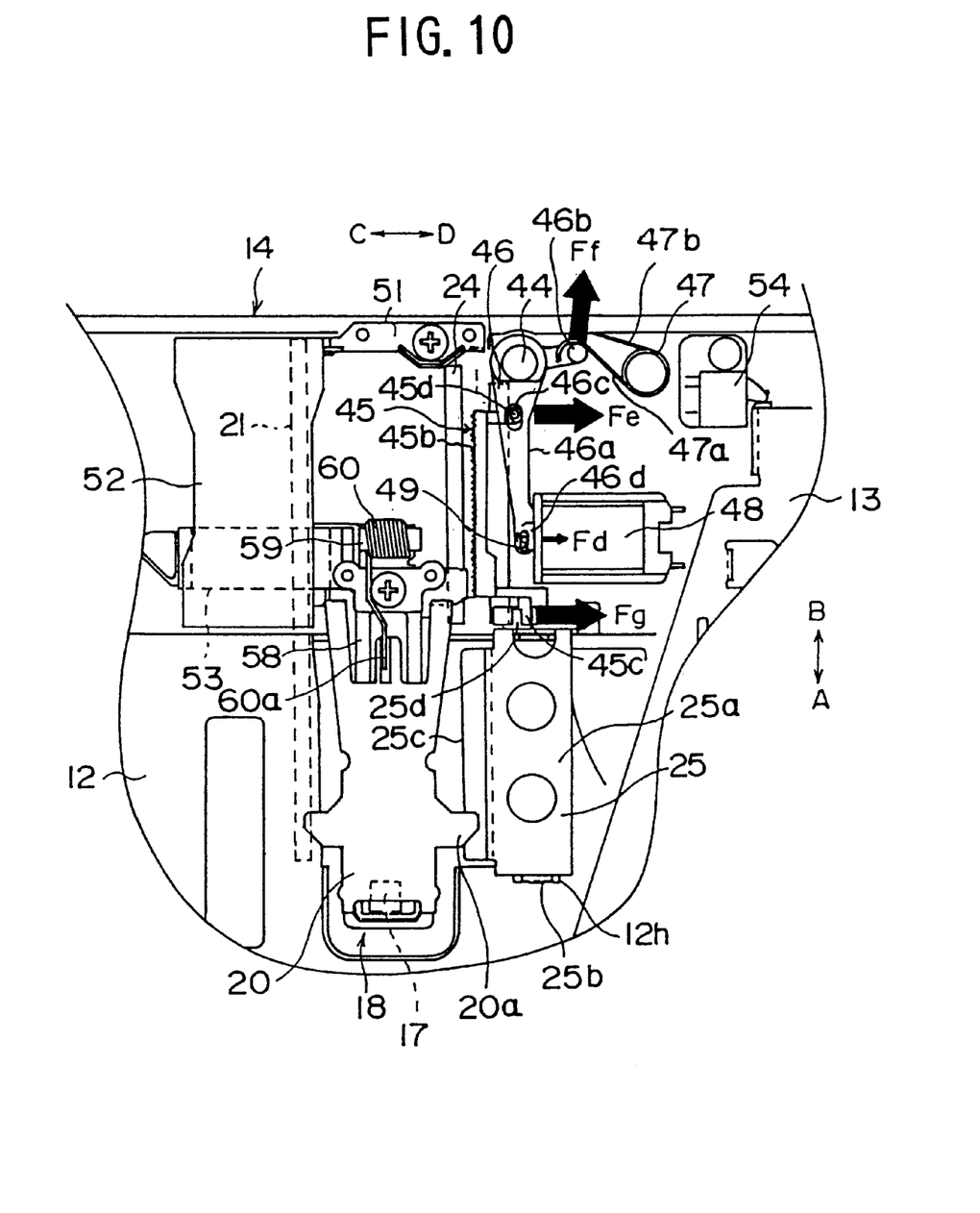
FIG. 10 shows a magnified plan view showing the head carriage and the periphery thereof in a case where a seeking operation is performed in the recording and reproducing mode in the magnetic disk device.

FIG. 10 shows a magnified plan view showing the head carriage 18 and the periphery thereof in a case where the seeking operation is performed in the recording and reproducing mode.

As shown in FIG. 10, in this case, when the disk cartridge inserted into the disk holder 12 moves to a recording and reproducing position, a disk sensor (not shown in the figure) enters an ON condition, the rotation speed of a disk motor (not shown in the figure) which drives the turntable 15 reaches a predetermined high speed, and, then, the solenoid 48 is energized.

Thus, in this case, the solenoid 48 is energized, and attracts the plunger 49 in the direction D. Thereby, the stopper coupling lever 46 connected with the plunger 49 rotates counterclockwise, and causes the rack 45b of the carriage stopper 45 to be removed from the movable rack 56 of the head carriage 18. As a result, the locking of the head carriage 18 by the carriage stopper 45 is released.

Thereby, the head carriage 18 performs the seeking operation in radial directions (directions A, B) of the magnetic disk by the driving force of the voice-coil motor 52. Thus, the magnetic heads 16, 17 can be caused to face a desired track of the magnetic disk.

The plunger 49, which is attracted in the direction D as a result of the solenoid 48 being energized, is connected with the projecting end portion 46d of the arm 46a of the stopper coupling lever 46. As a result, the attracting force Fd of the solenoid 48 is increased, in the principle of the lever, to forces Fe, Ff which push the projecting pin 45d which engages with the engaging hole 46c provided midway in the longitudinal direction of the arm 46a, and the torsion spring 47, respectively. Further, the attracting force Fd of the solenoid 48 also acts as a pushing force Fg by which the V-shaped recess portion 45c of the carriage stopper 45 pushes the engaging pin 25d of the lifter 25 in the direction D.

Therefore, even when the attracting force Fd of the solenoid 48 is small, this force is thus increased through the stopper coupling lever 46 and is transmitted to the carriage stopper 45 and lifter 25. Accordingly, even when the solenoid 48 is a small one, a sufficient driving force can be obtained. Thereby, power consumption of the solenoid 48 can be reduced, and, also, a space required for setting the solenoid 48 is reduced so that the device can be miniaturized.

Figure 11A:
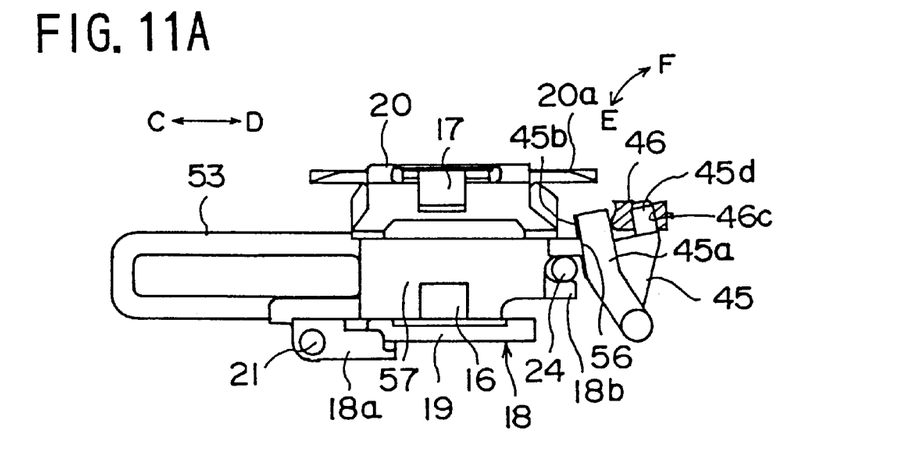
FIGS. 11A, 11B and 11C show front elevational views illustrating an operation of a carriage stopper for the head carriage in the magnetic disk device.
Figure 11B:
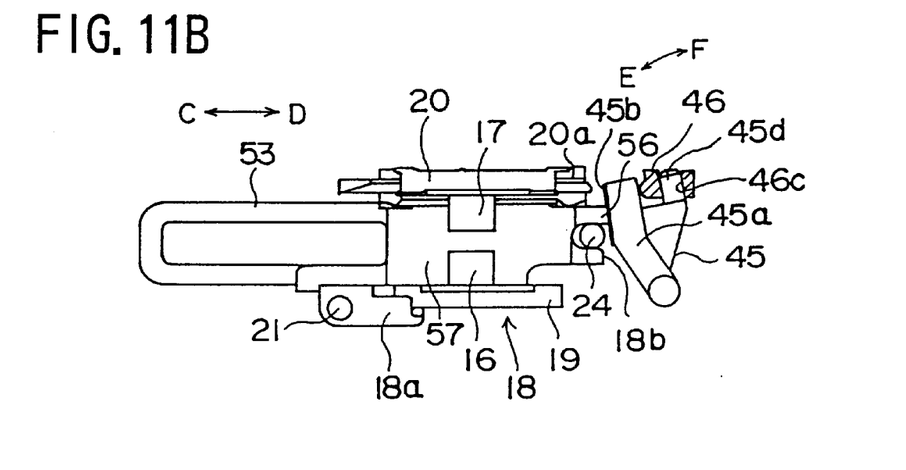
Figure 11C:
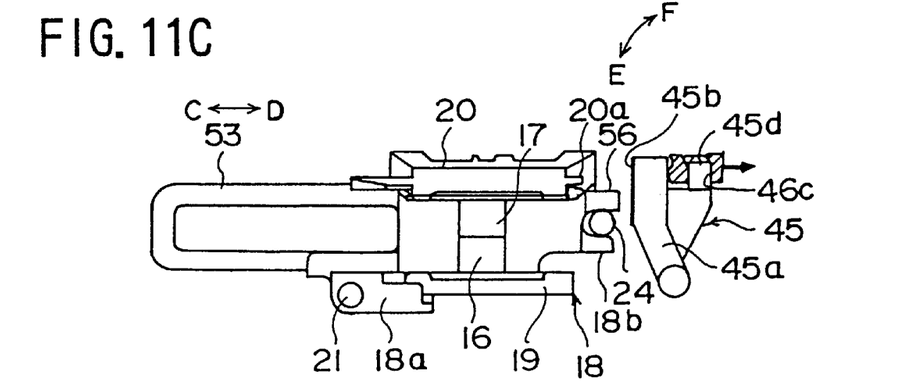

FIGS. 11A, 11B and 11C show front elevational views illustrating an operation of the carriage stopper 45 for the head carriage 18.

FIG. 11A shows the condition in the ejecting mode. The stopper coupling lever 46 is pushed in the direction C by the spring force of the torsion spring 47. Thereby, the carriage stopper 45 rotates in the direction E by the spring force of the torsion spring 47, and the rack 45b engages with the movable rack 56 of the head carriage 18. Thus, the head carriage 18 is locked by the carriage stopper 45.

FIG. 11B shows the waiting-for condition in the recording and reproducing mode. In this condition, similar to the case in the ejecting mode, the stopper coupling lever 46 is pushed in the direction C by the spring force of the torsion spring 47. Thereby, the carriage stopper 45 rotates in the direction E by the spring force of the torsion spring 47, and the rack 45b engages with the movable rack 56 of the head carriage 18 so that the head carriage 18 is locked.

FIG. 11C shows the condition in the case where the seeking operation is performed in the recording and reproducing mode. In this condition, as described above, the solenoid 48 is energized, and the stopper coupling lever 45 is driven in the direction D. Thereby, the carriage stopper 45 rotates in the direction F by the driving force of the solenoid 48, the rack 45b is removed from the movable rack 56 of the head carriage 18, and, thus, locking of the head carriage 18 is released. Thereby, the head carriage 18 can perform the seeking operation in the directions A, B.

Figure 12A:
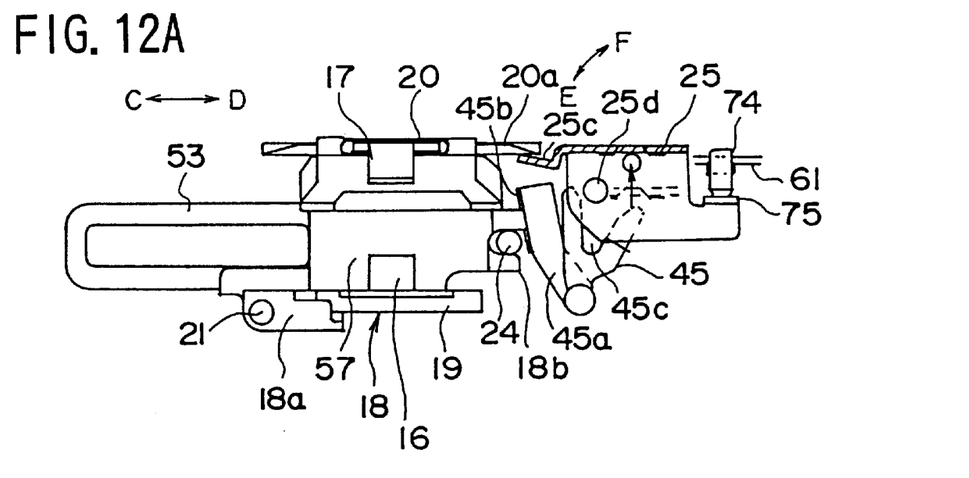
FIGS. 12A, 12B and 12C show front elevational views illustrating operations of the carriage stopper and a lifter for the head arm in the magnetic disk device.
Figure 12B:
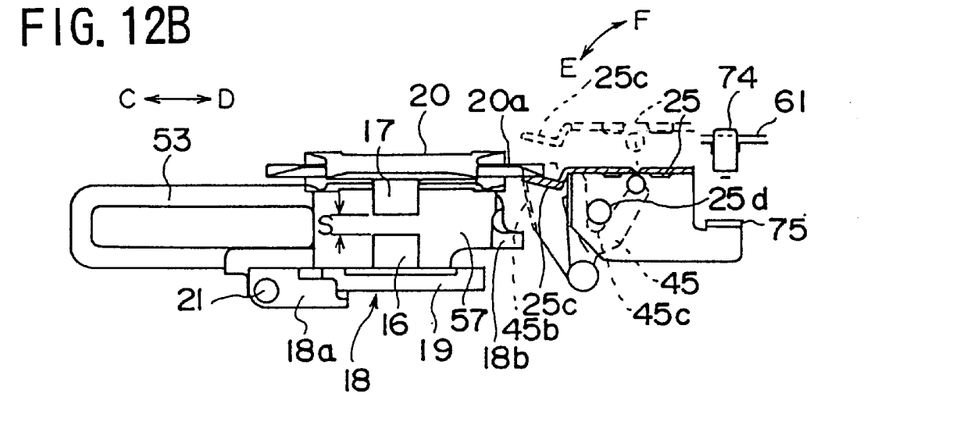
Figure 12C:
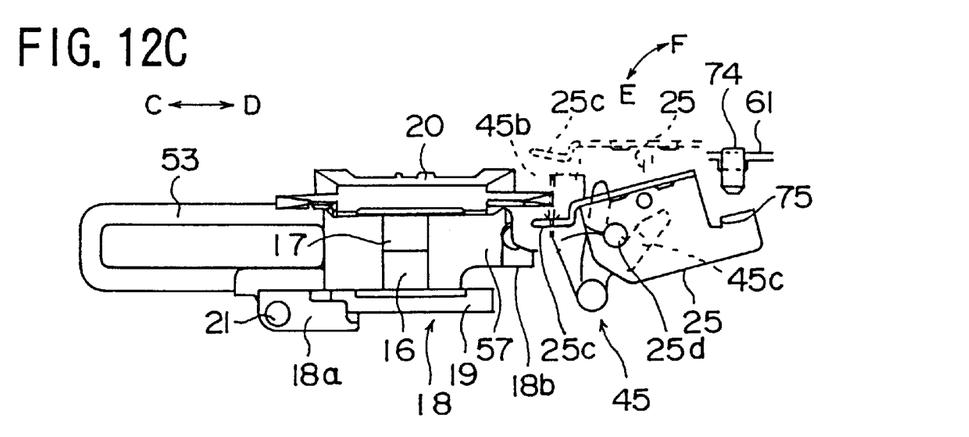

FIGS. 12A, 12B and 12C show front elevational views illustrating operations of the carriage stopper 45 and the lifter 25 for the head arm 20.

FIG. 12A shows the condition in the ejecting mode. The carriage stopper 45 rotates in the direction E by the spring force of the torsion spring 47, and the rack 45b engages with the movable rack 56 of the head carriage 18. Further, because the disk holder 12 has risen to the cartridge inserting and ejecting position, the lifter 25 also has risen.

In a holding member 61, which is substantially fixed to the frame 14, an adjusting bolt 74 for adjusting the height of the lifter 25 is screwed. The bottom end of the adjusting bolt 74 comes into contact with a contact portion 75 which extends from the end of the lifter 25. Therefore, by changing an amount of screwing of the adjusting bolt 74 to the holding member 61, it is possible to adjust an amount of lifting of the lifter 25.

Further, in the process of rising of the disk holder 12 to the cartridge inserting and ejecting position, the contact portion 75 provided integrally to the lifter 25 comes into contact with the bottom end of the adjusting bolt 74. The lifter 25 is supported on the top surface of the disk holder 12 rotatably about the shafts 25b in the directions E, F. Therefore, in response to the upward movement of the disk holder 12, the contact portion 75 extending rightward from the lift 25 comes into contact with the bottom end of the adjusting bolt 74, and, thereby, the lifter 25 rotates in the direction F.

Further, the projection 20a projecting rightward from the head arm 20 is in contact with the contact portion 25c provided on the left side of the lifter 25. Therefore, the lifter 25 rotates in the direction F in response to the upward movement of the disk holder 12, and, thereby, the projection 20a of the head arm 20 is lifted by the contact portion 25c. Thereby, the head arm 20 is maintained in an upward moved position in which the upper magnetic head 17 is apart from the lower magnetic head 16.

At this time, the engaging pin 25d of the lifter 25 is apart from the V-shape recess portion 45c of the carriage stopper 45.

FIG. 12B shows the waiting-for condition in the recording and reproducing mode. In this condition, the head arm 20 temporarily stops at an intermediate position between the cartridge inserting and ejecting position and the cartridge loading position. At this time, in response to the falling movement of the disk holder 12, the engaging pin 25d projecting from the end portion of the lifter 25 in the direction B is inserted into the V-shaped recess portion 45c of the carriage stopper 45. Then, the engaging pin 25d of the lifter 25 is received by the V-shaped recess portion 45c of the carriage stopper 45, and comes into contact with the inclined portion of the V-shaped recess portion 45c.

Thus, the lifter 25 is stopped at an intermediate position midway from the cartridge inserting and ejecting position to the cartridge loading position. Therefore, the rotation movement of the head arm 20 which moves together with the lifter 25 is temporarily stopped.

In this waiting-for condition, because the head arm 20 is stopped at the intermediate position before falling to the cartridge loading position, the magnetic head 17 supported at the projecting end portion of the head arm 20 faces the magnetic head 16 supported at the projecting end portion of the carriage body 19 with a predetermined space S present therebetween. Thereby, the magnetic head 17 is located above the magnetic disk (not shown in the figure).

Further, the lower magnetic head 16 does not come into contact with the magnetic disk until the disk holder 12 has fallen to the cartridge loading position. However, when the head arm 20 rotates downward in response to the falling movement of the disk holder 12, the magnetic disk pushed by the upper magnetic head 17 instantaneously comes into contact with the lower magnetic head 16.

FIG. 12C shows the condition in the case where the seeking operation is performed in the recording and reproducing mode. In this condition, the solenoid 48 is energized and the stopper coupling lever 46 is driven in the direction D, as described above. Thereby, the carriage stopper 45 rotates in the direction F by the driving force of the solenoid 48, and the rack 45b is removed from the movable rack 56 of the head carriage 18. As a result, the locking of the head carriage 18 is released.

In response to the rotation of the carriage stopper 45 in the direction F, the V-shaped recess portion 45c of the carriage stopper 45 pushes the engaging pin 25d of the lifter 25 downward. Thereby, in response to the rotation of the carriage stopper 45 in the direction F, the lifter 25 rotates in the direction E, and the contact portion 25c of the lifter 25 falls.

Thereby, the head arm 20 falls. Accordingly, after stopping at the position in proximity to the magnetic disk (not shown in the figure) in the above-mentioned waiting-for condition, the magnetic head 17 supported by the head arm 20 comes into contact with the magnetic disk in response to the falling movement of the head arm 20 so that the magnetic head 17 and the lower magnetic head 16 sandwich the magnetic disk.

Thus, the magnetic head 17 moves intermittently to the recording and reproducing position in which the magnetic head 17 slides on the magnetic disk. As a result, the shock applied to the magnetic disk, which rotates at high speed, by the magnetic head 17 can be eased. Thereby, the magnetic films formed on the surfaces of the magnetic disk can be prevented from being damaged.

An ejecting operation is an operation reverse to the above-described loading operation, and description thereof will be omitted.

As described above, in the magnetic disk device 11, the moving speed of the slider 13 is reduced by the mechanical damper mechanism 31, and also, the falling movement of the head arm 20 is performed intermittently, as described above. Thereby, the movement speed in the vertical direction of the magnetic head 17 changes gradually.

Thus, the magnetic head 17 comes into contact with the magnetic disk slowly from the position in proximity to the magnetic disk. Thereby, the magnetic head 17 does not bound when coming into contact with the magnetic disk, and the magnetic films of the magnetic disk are positively prevented from being damaged.

Although the above-described embodiment is the magnetic disk device, the present invention can also be applied to, for example, an optical disk device, a magneto-optical disk device, a recording and reproducing device in which a card-shaped recording medium such as a memory card or the like is loaded, and so forth.

Further, although the slider slides above the disk holder in the above-described embodiment, the present invention can also be applied to an arrangement in which the slider slides below the disk holder.

The present invention is not limited to the above-described embodiment, and variations and modifications may be made without departing from the scope of the present invention.

The contents of the basic Japanese Patent Application No. 9-312369, filed on Nov. 13, 1997, are hereby incorporated by reference.

What is claimed is:

1. A recording-medium recording and reproducing device, comprising:

a head carriage supporting a head which performs recording and reproducing on a recording medium;

a guide shaft guiding a movement of said head carriage;

a guide-shaft holding member holding an end portion of said guide shaft at a predetermined position of a frame; and a driving portion moving said head carriage along said guide shaft, wherein said guide-shaft holding member comprises:

a fixed portion fixed on said frame;

a leaf spring portion, having a thickness, extending from said fixed portion and pushing said end portion of said guide shaft to the frame, said leaf spring portion being elastically deformable in the direction of its thickness; and a supporting portion projecting from said fixed portion so as to support an intermediate portion of said leaf spring portion in the longitudinal direction of said leaf spring portion, said intermediate portion thereby being allowed to be elastically deformed.

2. The recording-medium recording and reproducing device as claimed in claim 1, wherein said supporting portion has a slit formed therein, said intermediate portion of said leaf spring portion being inserted into said slit so that said intermediate portion of said leaf spring portion is supported by said supporting portion.

3. The recording-medium recording and reproducing device as claimed in claim 1, wherein said leaf spring portion pushes said end portion of said guide shaft in a direction perpendicular to the longitudinal direction of said guide shaft.

4. The recording-medium recording and reproducing device as claimed in claim 1, wherein:

said frame has a receiving portion at said predetermined position, said receiving portion comprising a horizontally extending portion and a vertically extending portion; and said leaf spring portion pushes said end portion of said guide shaft to both said horizontally extending portion and said vertically extending portion of said receiving portion.

5. The recording-medium recording and reproducing device as claimed in claim 1, wherein:

said leaf spring portion comprises a base portion and a projecting end portion, said intermediate portion being located between said base portion and said projecting end portion, said base portion being located adjacent to said fixed portion, said projecting end portion comprising a free end of said leaf spring portion; and said projecting end portion of said leaf spring portion pushes said end portion of said guide shaft to said frame so as to be elastically deformed.

6. The recording-medium recording and reproducing device as claimed in claim 1, wherein said guide-shaft holding member is made of one plate to which said fixed portion, leaf spring portion and supporting portion are formed integrally.

* * * * *